Jan. 15, 1924.　　　　　　　　　　　　　　　　　　1,480,792
J. A. STREUN
FEEDER FOR COTTON GINS
Filed Jan. 15, 1923　　　　3 Sheets-Sheet 1

JOHN A. STREUN, Inventor

By Jesse R. Stone his Attorney

Jan. 15, 1924.

J. A. STREUN 1,480,792

FEEDER FOR COTTON GINS

Filed Jan. 15, 1923

3 Sheets-Sheet 2

JOHN A. STREUN, INVENTOR.

BY Jesse R. Stone

HIS ATTORNEY.

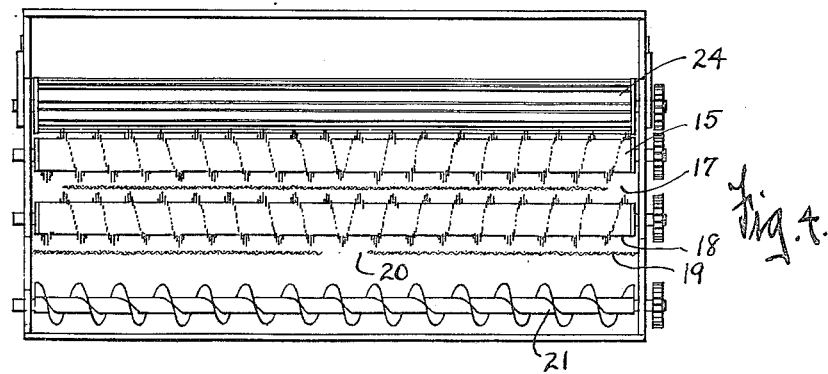
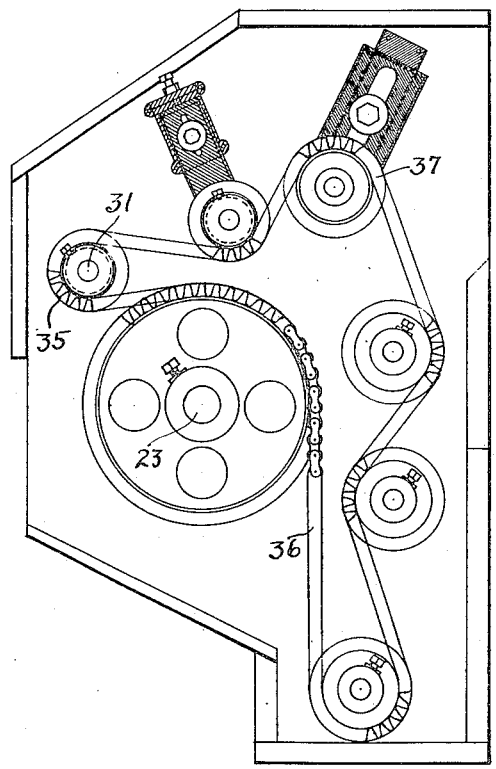

Patented Jan. 15, 1924.

1,480,792

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

FEEDER FOR COTTON GINS.

Application filed January 15, 1923. Serial No. 612,655.

*To all whom it may concern:*

Be it known that I, JOHN ARNOLD STREUN, a citizen of the United States, residing at Sherman, Grayson County, Texas, have invented a certain new and useful Improvement in Feeders for Cotton Gins, of which the following is a full, clear, and exact description, such as will enable others skilled in the art to which it appertains to make and use the same.

My invention relates to feeding apparatus for use in feeding cotton to the gin. It is particularly adapted to feed cotton filled with bolls, burrs, and hulls and to act to clean the trash from the cotton before it is ginned. An object of the invention is to provide a feeder of the type stated which will clean the cotton efficiently and also be compact in size and easily attached to the ordinary gin. It is also desired to make the device simple and strong and not liable to damage the cotton fibre.

Figure 1:
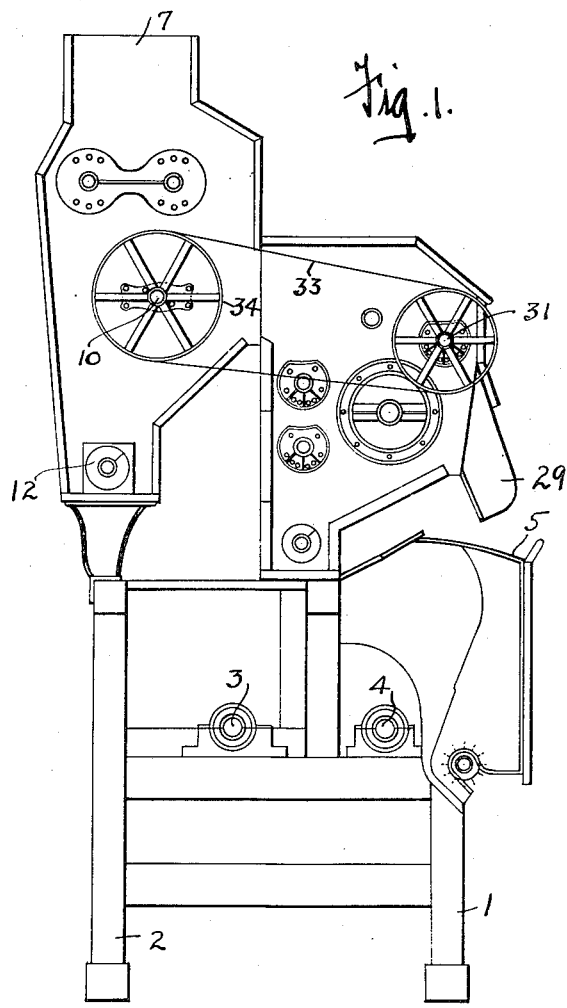
Figure 2:
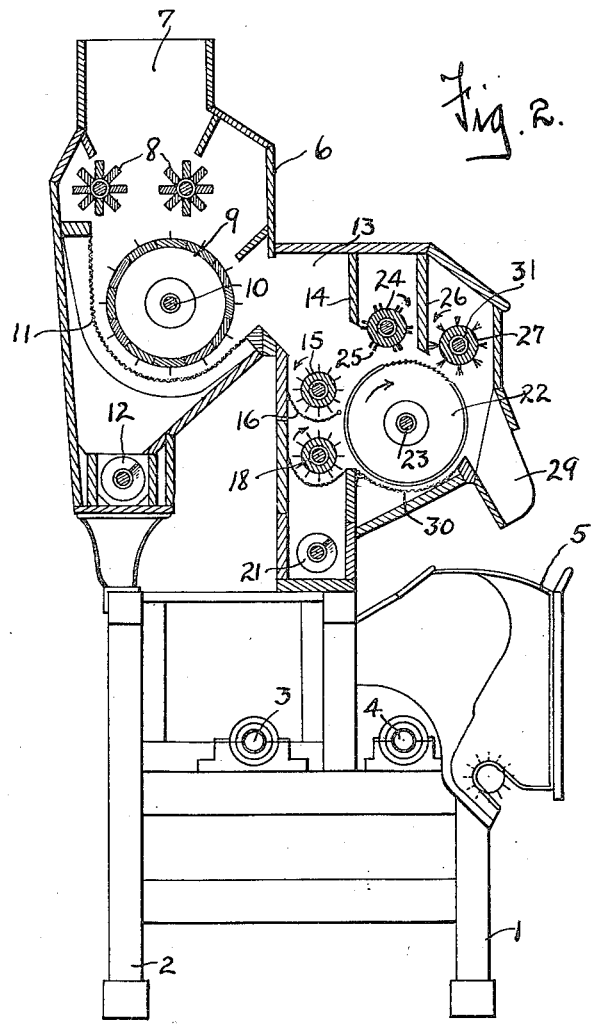

In the drawings herewith, forming a part of this specification a preferred embodiment of my invention is disclosed. Like numerals of reference are applied to like parts in all the views. Fig. 1 is a side elevation of a cotton gin with my improved feeder attachment thereon; Fig. 2 is a similar view with the feeder in longitudinal vertical section; Fig. 3 is a side elevation of the feeder improvement viewed from the side opposite that shown in Fig. 1; Fig. 4 is a rear view of the feeder attachment showing the cleaning rollers, the rear side being broken away for clearness.

The ordinary cotton gin commonly has a feeder that is designed to take out some of the dirt from the cotton before it reaches the gin, but such a feeder cannot handle a poor quality of bolly cotton having burrs and trash therein. I have therefore added to the feeder a cleaning device which will handle such cotton and which constitutes my present improvement.

I have shown in the drawing an ordinary gin having supporting legs 1 and 2 with ginning rolls therein, said rolls being mounted on shafts 3 and 4. The cotton is fed into the forward end 5 of the gin and passes to the gin rolls.

Above the gin and to the rear is a feeder of common construction 6 comprising a hopper 7 adapted to conduct the cotton to feeding rolls 8 which rotate to feed the cotton to the toothed cleaning roller 9 mounted on shaft 10. This cleaning roll is of large diameter with radial pins constituting teeth to carry the cotton over a foraminous screen 11 through which an amount of dirt may fall to the screw conveyor 12 which discharges it from the machine.

To this feeder I have added my cleaner comprising a series of rolls and screens adapted to clean bolls and burrs from the lint. From the feeder the cotton is discharged to the cleaner through an opening 13 in front of which is a baffle 14 directing the cotton to the rapidly moving spiked agitating roller 15. Below this roller is a wire screen 16 to allow the escape of the finer particles of dirt and chaff. The spikes or teeth on this roller are arranged spirally on the roller, the spirals being formed so as to work the cotton and trash from the center toward both ends as shown in Fig. 4. The screen 16 is shorter than the roll and allows spaces 17 at each end for the cotton to be discharged downwardly on to the roll below.

The agitating roll 18 below roll 15 is also toothed and has the teeth arranged similarly to those on the first roll. The rotation of roll 18 is such as to move the trash from the ends toward the middle. Below the roll is a screen 19 having an opening 20 intermediate the ends to allow the bolls and burrs to fall downwardly to a conveyor 21.

Immediately in front of the agitating roll 15 is a larger saw-toothed roller 22, the purpose of which is to catch the cotton and remove it from the trash. It moves more slowly than the roll 15 and is mounted on a shaft 23 having a bearing in the sides of the frame work of the cleaner.

Above the roller 22 is a stripper cylinder 24 having stripping blades 25 thereon. This roller rotates in a clockwise direction as seen in Fig. 2 and serves to strike the burrs and bolls caught with the cotton on the saw cylinder and throw them back on to the rolls 15 and 18.

A baffle 26 separates the stripper roll from a brush roll 27 which has bristles thereon to brush the cotton from the teeth of the saw cylinder. This roll rotates in a counterclockwise direction and the saw roll rotates in a clockwise direction and tends to throw the lint and seed to the feeding chute 29. Below the saw cylinder is a perforated screen 30 and cotton trash and burrs adhering to the saw cylinder are carried over this screen to the clearing rolls 15 and 18, where they are further agitated and broken up.

The shaft 31 upon which the roll 27 is mounted, is provided with a pulley 32 on one end, by means of which it is rotated through a belt 33 from a pulley 34 on the feeder roll shaft 10. On the opposite end of shaft 31 is a sprocket wheel 35. Each of the other rolls of the cleaner is similarly provided with sprocket wheels and a sprocket chain 36 serves to rotate them from the wheel 35. An idle sprocket wheel 37 is adjustably mounted on the end of the cleaner to tighten the chain as desired.

In the operation of my cleaner, the cotton comes to the roll 15 from the feeder and is carried rapidly around by the teeth of said roll to break up the bolls. This roll throws the cotton against the saw cylinder. Burrs tending to adhere to the cotton on the saw cylinder are struck and thrown back from the lint by the blades of the stripper cylinder 24. Cotton lint on the saw roll is brushed off to the gin by the brush roll 27 as previously set forth. The burrs and trash thus pass along the toothed cleaning roller 15 and are agitated as they pass to the opening 17 at the ends of the screen 16. The trash is then carried along the screen 19 to the opening 20 and to the conveyor which discharges it from the gin. By being thus agitated and broken up in close contact with the saw cylinder 22 the lint is all caught and carried from the refuse in a most advantageous and efficient manner. The cotton thus passes to the gin thoroughly cleaned of trash and all the available lint is saved.

I have thus provided a compact and economical cleaning feeder which may be readily applied to any ordinary gin. The advantages of this device will be obvious without further description.

What I claim as new and desire to protect by Letters Patent is:

1. A cleaner attachment for cotton gins comprising a plurality of vertically spaced agitating rolls, a saw cylinder of comparatively large diameter in front of said agitating rolls, a screen closing the space below said rolls and cylinder except for an opening below and intermediate the ends of the lowest of said rolls, a stripper cylinder above said saw cylinder, and a brush roll of small diameter compared with said saw cylinder above and to the front thereof, said brush roll adapted to rotate in an opposite direction and at a higher speed than said saw cylinder and remove the cotton lint therefrom.

2. A cleaner attachment for cotton gins comprising a plurality of vertically spaced agitating rolls, a saw cylinder of comparatively large diameter in front of said agitating rolls, a screen closing the space below said rolls and cylinder except for an opening intermediate the ends of the lowest of said rolls, and a comparatively small brush roll above said saw cylinder adapted to brush the cotton therefrom in the manner described.

In testimony whereof, I hereunto affix my signature this the 9th day of January, A. D. 1923.

JOHN ARNOLD STREUN.